US007613793B2

(12) United States Patent
Bondar et al.

(10) Patent No.: US 7,613,793 B2
(45) Date of Patent: Nov. 3, 2009

(54) METHOD AND SYSTEM FOR PROVIDING A WEB SERVICE BY A PLURALITY OF WEB DOMAINS THROUGH A SINGLE IP ADDRESS

(75) Inventors: Gregory Bondar, Rishon Lezion (IL); Nir Baram, Tel Mond (IL)

(73) Assignee: Parallels Holdings, Ltd. (BM)

(*) Notice: Subject to any disclaimer, the term of this patent is extended or adjusted under 35 U.S.C. 154(b) by 1050 days.

(21) Appl. No.: 10/784,570

(22) Filed: Feb. 23, 2004

(65) Prior Publication Data
US 2004/0236861 A1 Nov. 25, 2004

Related U.S. Application Data

(63) Continuation of application No. PCT/IL02/00695, filed on Aug. 22, 2002.

(30) Foreign Application Priority Data

Aug. 23, 2001 (IL) .................................... 145105

(51) Int. Cl.
*G06F 15/16* (2006.01)
(52) U.S. Cl. ...................... 709/219; 713/155; 713/182; 718/104
(58) Field of Classification Search ................. 709/203, 709/225, 235, 245, 246, 250, 219, 230; 713/155, 713/180; 718/104; 726/11; 703/21; 370/352; 707/103
See application file for complete search history.

(56) References Cited

U.S. PATENT DOCUMENTS 5,898,780 A * 4/1999 Liu et al. .................... 713/155

| | | | |
|---|---|---|---|
| 6,052,788 A * | 4/2000 | Wesinger et al. ............... 726/11 |
| 6,219,707 B1 * | 4/2001 | Gooderum et al. ........... 709/225 |
| 6,466,977 B1 * | 10/2002 | Sitaraman et al. ............ 709/225 |
| 6,910,067 B1 * | 6/2005 | Sitaraman et al. ............ 709/203 |
| 6,948,003 B1 * | 9/2005 | Newman et al. .............. 709/250 |
| 6,976,258 B1 * | 12/2005 | Goyal et al. .................. 718/104 |
| 6,999,912 B2 * | 2/2006 | Loisey et al. ................... 703/21 |
| 7,010,582 B1 * | 3/2006 | Cheng et al. ................. 709/219 |

(Continued)

OTHER PUBLICATIONS

Brian Ackerman, "Virtual Services Howto", Aug. 1998, The Computer Resource Center Inc., 42 pages.*

(Continued)

*Primary Examiner*—Dustin Nguyen
(74) *Attorney, Agent, or Firm*—Bardmesser Law Group

(57) ABSTRACT

A method and system for providing a Web service by a plurality of Web domains hosted by a computer, through a single IP address, is disclosed. A server having a unique domain name and the same IP address is allocated for each of the domains, while a software module intermediates between a client of the service and each of the servers. Upon receiving a request for connecting the client to one of the servers in order to provide the service, the target domain name of the request is identified by interacting between the client and the software module via standard communication protocol. The software module communicates with the server providing the service associated with the target domain name also by the standard protocol. A communication channel is then established between the server and the client, so that the server is allowed to provide the desired service to the client.

21 Claims, 2 Drawing Sheets

U.S. PATENT DOCUMENTS

| | | | |
|---|---|---|---|
| 7,035,942 B2 * | 4/2006 | Daniell et al. | 709/246 |
| 7,110,393 B1 * | 9/2006 | Tripathi et al. | 370/352 |
| 7,137,006 B1 * | 11/2006 | Grandcolas et al. | 713/180 |
| 7,174,390 B2 * | 2/2007 | Schulter et al. | 709/245 |
| 7,299,294 B1 * | 11/2007 | Bruck et al. | 709/235 |
| 2002/0023091 A1 * | 2/2002 | Silberberg et al. | 707/103 Y |
| 2008/0126553 A1 * | 5/2008 | Boucher et al. | 709/230 |

OTHER PUBLICATIONS

WIPO search and written reports for PCT/IL02/00695 on Mar. 18, 2004 and Feb. 23, 2004.*

Elz et al., "draft-ieft-ftpext-mlst-08:Extensions to FTP," IETF, Online!, Oct. 1999, pp. 1-60.

R. Fielding et al., RFC 2616: Hypertext Transfer Protocol—HTTP/1.1, IETF, Jun. 1999, p. 7, paragraph 1.1; p. 24, paragraph 5.1; p. 25, paragraph 5.2; p. 79, paragraph 14.23; p. 105, paragraph 19.6.1.1.

* cited by examiner

|   | Client | | Inetd / wrapper | | FTP server |
|---|---|---|---|---|---|
| 1. | Connect to the FTP port | → | Get the request. Open a port, and get commands. | | |
| 2. | Various commands | → | Keep the information in the buffer. | | |
| 3. | "USER xxx%aaa.com" | → | Keep only "USER xxx" in the buffer. | | |
| 4. | | | Create an FTP process, for the "xxx" domain. | → | |
| 5. | | | Finish execution if "wrapper" is an independent process. | | |
| 6. | | | | | Get commands from the internal buffer. (which seem like arriving from the network). |
| 7. | "PASS" command | | → | | Verify the password. |
| 8. | Command to download or upload files | | → | | Handle the commands. |

*Fig. 1*

METHOD AND SYSTEM FOR PROVIDING A WEB SERVICE BY A PLURALITY OF WEB DOMAINS THROUGH A SINGLE IP ADDRESS

This application is a continuation of PCT International Application No. PCT/IL02/00695, filed 22 Aug. 2002 and titled "A METHOD AND SYSTEM FOR PROVIDING A WEB SERVICE BY A PLURALITY OF WEB DOMAINS THROUGH A SINGLE IP ADDRESS", which claims benefit under 35 U.S.C. §119(a) of Israeli Application Serial No. 145105, filed 23 Aug. 2001.

FIELD OF THE INVENTION

The present invention relates to the field of Web hosting. More particularly, the invention relates to a method and system for providing a Web service (HTTP, FTP, POP3, SMTP and other Web services) by a plurality of Web domains through a single IP address

BACKGROUND OF THE INVENTION

A Domain refers to group of Web services provided by or in behalf of an enterprise. Usually it comprises a set of network addresses, each of which provides one or more Web services (HTTP, Telnet, FTP, E-mail, etc.).

A Domain name is the part of the URL (Uniform Resource Locator) that indicates to a domain name server using the domain name system (DNS) whether and to which location to forward a request for a Web page or Web service. The domain name is mapped to an IP address, which represents an identifiable point within the Internet.

IP-address (Internet Protocol address) is the address of a computer attached to a TCP/IP network. Every client and server station that can be addressed via the Internet must have an IP address. A specific computer can have more than one IP address associated with it. If a computer has more than one IP address, these addresses can be associated with different NICs (Network Interface Cards), or several IPs can be associated with one NIC. In some cases, one IP is associated with several computers, using a Load Balancer or firewall. In that case, the external device (load balancer or firewall) translates the external IP to some local IP, and vice-versa.

IP addresses are written as four sets of numbers separated by periods; for example, 204.171.64.2. The TCP/IP packet uses 32 bits to contain the IP address, which is made up of a network address (NetID) and host address (HostID). Certain high-order bits identify class types and some numbers are reserved. On the Internet itself—that is, between the router that moves packets from one point to another along the route—only the network part of the address is looked at.

While more bits are used for network addresses, fewer remain for hosts. As the Internet becomes popular, the IP address resources are exhausted, and consequently the IP addresses become a precious resource.

A few years ago, every domain on the Internet had its own IP address, but currently, due to the rapid depletion of the IP resources, there has been an increased effort to develop technologies for sharing one IP address among a plurality of domains. Actually, the use of one IP address for serving a plurality of Web sites that provide HTTP services was already dealt with in the prior art, and was referred to as Virtual hosting.

There are two methods for carrying out virtual hosting: Name-based virtual hosting and IP-based virtual hosting. In IP-based virtual hosting, one host computer deals with a plurality of IP addresses, each of which corresponds to a domain. In name-based virtual hosting, one IP address is shared by a plurality of domains.

The HTTP/1.1 protocol and a common extension to HTTP/1.0 support name-based virtual hosting, and accordingly Web servers are compatible with this protocol. This is implemented by including the Web domain in the HTTP "GET" request. However, in the prior art no solutions to the problem of sharing one IP address among a plurality of domains that provide Web services beyond HTTP (such as FTP and e-mail services) has been presented.

It is an object of the present invention to provide a method and system for providing a web service by a plurality of web domains through a single IP address, which can be implemented for HTTP as well as for FTP, SMTP, POP3 and other Web services.

Other objects and advantages of the invention will become apparent as the description proceeds.

SUMMARY OF THE INVENTION

In one aspect, the present invention is directed to a method for providing a Web service by a plurality of Web domains hosted by a computer, through a single IP address, comprising:

For each of the domains, allocating a server having a unique domain name and the IP address, for providing the service;

Providing a wrapper, being a software module for intermediating between a client of the service and the servers via a standard communication protocol for communicating with each of the servers;

Upon receiving a request for connecting the client to the one of the servers in order to provide the service:

Identifying the target domain name of the request by interacting between the client and the wrapper via the standard communication protocol;

Interacting between the wrapper and the server providing the service which is associated with the target domain name by the standard communication protocol;

Establishing a communication channel between the server and the client utilizing the standard communication protocol; and Allowing the server to provide the service to the client.

The usernme phrase being used preferably includes the username and the domain, and the domain name may be separated from the user name by one or more characters which do not conform with the standard characters allowed in the username according to the standard communication protocol.

According to one embodiment of the invention the username phrase is "user%domain" or "domain%user", in which "user" is the username, "domain" is the domain name, and "%" is any character which does not conform with the standard protocol for such phrasing purposes.

The Web services can be HTTP, FTP, POP3, SMTP, MIRC, Telnet, SSH, Rtelnet, and Shell.

Each of the Web domains may refer to a different Virtual Dedicated Server.

The computer system may be a Unix-based system, any dialect of Unix, Solaris, Linux (Red Hat, Debian, SuSE, FreeBSD, etc.), AIX, HP/UX, Tru64, or Irix.

According to one embodiment of the invention each domain has its own instance of the server, and the server(s) of some or all of the domains share the same disk space. Optionally, one instance of some or all of the server(s) resides at the Host, and being referenced by hard links from the domains.

In another aspect, the present invention is directed to a system for providing a Web service to a client by a plurality of Web domains hosted by a computer, through a single IP address, comprising:

A server for providing the service, for each of the domains; and

A wrapper, for intermediating between the client and the servers, such that communicating with the client is carried out via the standard communication protocol, where for each request for connecting said client and said server said wrapper identifies the target domain name by interacting with said client via said standard protocol, interacts with the server associated with said target domain name via said standard protocol, and enables said server to provide said service to said client.

The wrapper may be kept active for the entire session, or alternatively it may be kept active only until the requested server is identified, and the communication is handled to this server.

The preferred embodiment of the invention may further comprise a new shared library including additional functionality to the original shared library to which the standard communication protocol refers, and the additional functionality of the new shared library is preferably added to the original shared library by hooking.

Optionally, a buffer is provided to each socket, for retaining temporarily the information received from the client, and reading the data from said buffer if it is not empty, or from the socket if it is empty. Additionally, write commands may be ignored until the buffer is empty.

One encryption key may be used for all domains on each Host. In addition, the wrapper may be provided with information related to secured services of the target domain in plain text.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein:

FIG. 1 schematically illustrates a typical FTP session, according to one embodiment of the invention.

DETAILED DESCRIPTION OF PREFERRED EMBODIMENTS

Figure 2:
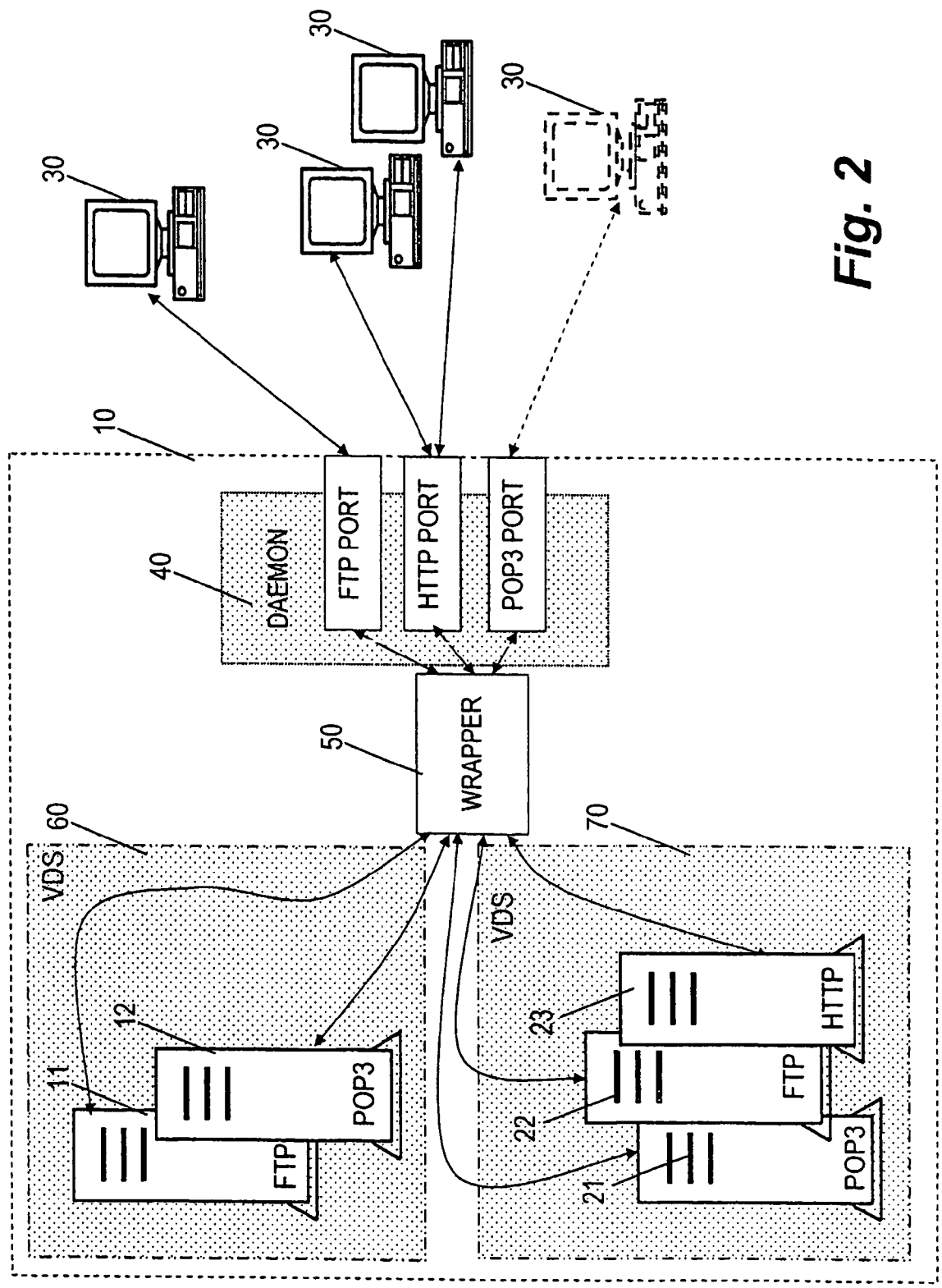
FIG. 2 schematically illustrates Web servers hosted by VDS systems that are hosted by one computer system, according to a preferred embodiment of the invention.

Without any loss of generality, the examples herein refer to a Unix-based operating system, such as Solaris, Linux (Red Hat, Debian, SuSE, FreeBSD, etc.), AIX, HP/UX, Tru64, Irix, and so forth.

Client/server describes the relationship between two computer programs in which one program, the client, makes a service request from another program, the server, which fulfills the request. Although the client/server relationship can be used by programs within a single computer, it is more beneficial in a network. In a network, the client/server model provides a convenient way to interconnect programs that are distributed efficiently across different locations. The client/server model has become one of the central ideas of network computing. Most business applications being written today use the client/server model, in addition to the Internet's main programs, which are usually based on the TCP/IP protocol.

A client process which is associated with an IP address actually communicates with a Web server. A Web server is a program that utilizes the client/server model "serve" requests for its services. Every computer on the Internet that contains a Web site must have a Web server program. On the one hand, a very large Web site may be spread over a number of servers in different geographic locations. On the other hand, one Web server can host a plurality of Web sites.

Regarding the Web, a Web server is the computer program that serves requested HTML pages or files. A Web client is the requesting program associated with the user. The Web browser in the user's computer is a client that requests HTML files from Web servers.

In the usual client/server model, one server, sometimes called a daemon, is activated and awaits client requests. Typically, multiple client programs share the services of a common server program. Both client programs and server programs are often part of a larger program or application. Relative to the Internet, a Web browser is a client program that requests services (the sending of Web pages or files) from a Web server (which technically is called a Hypertext Transport Protocol or Hypertext Transfer Protocol server) in another computer somewhere on the Internet. Similarly, a computer installed with TCP/IP installed is adapted to initiate client requests for files from FTP (File Transfer Protocol) servers in other computers on the Internet.

A Daemon is a process that awaits incoming requests and then forwards them to other process(es), when appropriate. On the Web, each server has an HTTPD (Hypertext Transfer Protocol daemon) that waits in attendance for requests to come in from the rest of the Web.

The term socket refers herein to a facility of directing data to an application via a TCP/IP network. The combination of the IP address of the station and a port number determines a socket. One computer writes data to a socket in order to send the data to a second computer, and the second computer reads from its socket the data. This can be illustrated as a telephone call. In order to speak with a subscriber, one has to dial its telephone number (in our case the IP address), and then its extension (the port number). After the connection has been established, one talks to its handset (socket), and the other listens through his handset (socket).

A well-known port refers herein to a protocol port that is widely used for a certain type of data on the network. For example, HTTP is typically assigned port 80, FTP transfer is port 21, the POP3 the port number 110, and X-Windows 6000. A Privileged port refers herein to a protocol port numbered from 1 through 1023.

Under a Unix-based operating system, the FTP server is a process that holds a communication session through a well-known port. During the communication session, the FTP server performs commands, as defined in RFC 959. RFC (Request For Comment) is a formal document from the Internet Engineering Task Force (IETF) that is the result of committee drafting and subsequent review by interested parties.

The first two commands usually to be performed are the "USER" and the "PASS" commands, which are used for identifying the user name and its password to the FTP server. The user identification is carried out prior to any further commands to the FTP server, such as downloading or uploading files. The FTP server validates the name and the password using the computer's username and password ("/etc/passwd" in a Unix-based systems), and if they correspond—the user is allowed to access files according to the specific user's permissions on the file system. Of course, any other secure mechanism can be used, and this scheme alone has been described herein for the sake of brevity.

Inetd (INternET Daemon) is a Unix function that manages many common TCP/IP services. It is activated at startup, waits for various connection requests (FTP, Telnet, etc.) and launches the appropriate server components.

According to the prior art, an FTP server or any other Internet server can be activated in two modes:

The "Inetd" mode, in which a single process (the Inetd daemon) serves a plurality of network services. The daemon "listens" on specific ports, waiting for requests for connection. When a request for connection arrives, it creates the service process (according to the well-known port), and allows it to handle the communication session.

The benefit of this approach is that the system resources are saved since there is a single process that listens on all the ports instead of a plurality of processes.

The "Stand-alone" mode, in which the relevant process is created once (for example, when the system boots), and the process handles the connections. This mode suits services that typically are active all the time and therefore starting and terminating a process every time a connection arrives results in an unnecessary overhead.

Usually, HTTP server operates in the Stand-alone mode, while the FTP server, POP3 server, and SMTP server operate in the "Inetd" mode.

The Problem of Name-Based FTP and E-mail

In the original design of the FTP as described in RFC 959, the FTP was directed to serving one domain, associated with one IP address, unlike the HTTP service in which the commands contain the object domain. Hence, if, for example, two domains ftp.aaa.com and ftp.bbb.com reside on the same hosting computer and share the same IP address, then the users xxx@ftp.aaa.com and xxx@ftp.bbb.com are the same. Moreover, if a user tries to access "ftp.aaa.com/pub/", he will reach the same directory as "ftp.bbb.com/pub/".

Those skilled in the art might determine a partial solution to this issue, by defining specific sub-directories for ftp.aaa.com and for ftp.bbb.com, and prevent the users of each domain accessing the other directory. However, there are several problems inherent in such an approach:

The users would know that there is another directory, but they would not be able to access it. This might be a drawback in Web hosting companies, as it is preferable that each domain be unaware of the existence of other domains residing on the same hosting computer.

Only one user with a specific name ("xxx" in the above example) can exist on a hosting computer, and therefore common names (like "webmaster", "jobs", "info" etc.) cannot be allocated to a plurality of domains. It should be noted that in order to support this solution, a system should keep the users of each domain in a separate location. For example, the VDS technology, as described in copending Israeli Patent Application No. 147560, is an example of such a solution.

A FTP server is used for all the domains hosted by a hosting computer. Therefore, there is no trivial way to calculate the resources consumed by a domain, as the process resources are shared.

By changing the permissions of a file, the file may become accessible to other users, such as "cookie" users.

The Solution

Actually, the basis of the problem described hereinabove is the protocol, which is not adapted for providing FTP services from a singular computer to a plurality of domains. The same problem relates to mail services as well. Due to the limitation in the protocol, providers of services are limited as well.

The problem of the "missing" domain applies only to POP3. In SMTP the domain is passed as well, and therefore there is no need to add the domain as part of the user name, as for FTP. However, the wrapper is still required for handling the requests by the correct server, i.e., the server of the appropriate VDS.

According to the solution disclosed herein, an intermediary between the client and the servers is added in the communication chain. The role of the intermediary is to identify in a request for service the domain of the request, and to direct the request to this server in a standard form.

Thus, the intermediary interacts with the client as it were the service provider, and with the service provider as it were the client.

Actually, after the domain is identified, the client can interact directly with the service provider associated with the appealed domain, i.e. without any intermediation.

Independent User Naming System

According to the prior art, a hosting computer that hosts the domains domai1.com, domain2.com, and so forth, cannot have two or more users with the name sysadmin, for example.

According to one embodiment of the invention, in order to enable an independent user naming system for each domain hosted on a hosting computer system, the domain name is embedded in the user name. Referring to the previous example, instead of identifying himself by the user name, i.e. xxx, a user identifies himself as xxx%aaa.com, xxx%bbb.com, and so forth.

Practically, on issuing a USER command according to the standard FTP protocol, the user identifies himself by a name wherein the domain is embedded, which according to this example is USERNAM%DOMAN, i.e. the user name followed by the character "%" and the domain name.

Of course, this syntax does not suit the standard protocol of the FTP as defined in RFC 959, and therefore an additional step should be carried out, as described hereinafter.

Hosting a Plurality of Domains by One Computer System

According to one embodiment of the invention, the FTP process is modified in order to support this format.

According to another embodiment of the invention, a component that handles the communication part is added to the communication chain. This component handles the connection to a third party's FTP server (i.e. the owner of the computer can use any FTP server—open source, commercial, or even homemade) when the user is identified. For the sake of brevity, it is assumed that this component is a process. This process is hereinafter called FTP-wrapper or wrapper.

When a connection to the FTP port arrives to the hosting computer, the daemon creates an FTP-wrapper process. The FTP-wrapper "negotiates" with the client as an FTP server, i.e., receives commands from the client and relays answers to the client as the FTP server. The negotiation is carried out until the client issues the "USER" command.

It should be noted that the wrapper might support only a subset of the FTP commands, as most commands are not supported before the user logged into the FTP server. Once the FTP-wrapper received the "USER" command, it confirms that it includes the user name and a valid domain name, and starts an FTP server for that domain.

It should be noted that in order to achieve better performance, the wrapper might be integrated into the daemon, so the creation of the wrapper process for each connection is unnecessary.

Once the original FTP server is created, it expects to have a communication from the beginning, including the "USER" command, and any prior commands that the user issued.

According to one embodiment of the invention, the wrapper process is kept active for the entire FTP session, thus acting as an interface between the client and the FTP server—every request for service is passed to the FTP server, and any result from the server is passed to the client.

A Shared library (or DLL in Windows operating system) is a collection of functions, usually related to some specific subject, that are kept in an independent file accessible to all the processes at run-time.

According to a preferred embodiment of the invention, the solution to the above-mentioned problem is based on that fact that most Unix-based processes are linked to shared libraries. The benefits of this approach are:

Each process is smaller, as the common functions are not part of the process itself. This requires less disk space for storing the program, and less disk space for distributing it.

Since the operating system can load a single copy of the library into memory and use it for several processes, the amount of memory required for several processes that use shared libraries is less than the amount needed for the same processes when executed without shared libraries.

In order to include new features in an existing function, correct bugs or correct security holes, new versions of the functions are developed. Upon installing a new version of a function in a shared library, processes being loaded at run time refer to the new version of the function, while other processes do not.

According to one embodiment of the invention, a new shared library that replaces the relevant functions of the original socket-library is activated, but the original socket-library is retained in order to be used later. A function of the new shared library performs some additional operations (which are not a part of the original function), and then activates the original library's function with the same name.

This mechanism is well-known in the art, and is referred to as hooking. A hook is a place (and usually an interface) provided in packaged code that allows a programmer to insert customized programming, such as additional features.

According to one embodiment of the invention, the hooking is carried out as follows:

A buffer is provided to each socket, for retaining temporarily the information received from the client.

During the operation, if the buffer is not empty, "read" commands read the data from this buffer, and if the buffer is empty, then the "read" command retrieves the data from the socket.

Any "write" command ignores the data until the "read" buffer is empty. After that, all the information is transferred to the socket. Whenever the process using the library performs a "write" command, the library checks the status of the internal buffer. If the internal buffer comprises any information, the information passed to the "write" command is ignored and a "success" status is returned to the caller, as this information was already handled by the wrapper. If no more data is present in the internal buffer, the information is passed to the normal sockets library.

According to a preferred embodiment of the invention, a special version of the socket library functions is provided as a shared library. The wrapper process refers to this library. The special version of the socket library writes data sent to or received from the socket into a buffer. Once the "USER" command is received, the FTP-wrapper process creates the FTP process. From this point on, the FTP server communicates directly with the client without the intermediation of the FTP-wrapper, i.e., the original functions are called, rather than the functions of the special version of the library. This results in a slight overhead.

An FTP Session

FIG. 1 schematically illustrates a typical FTP session, according to one embodiment of the invention.

At step 1, a client connects to an FTP port of a hosting computer. The Inetd receives the request, opens a port (i.e., communication channel with the client).

At step 2, carried out once the communication channel with the client has been established, any received FTP command except the USER command is stored in a buffer rather than processed (but a suitable reply/acknowledgment is sent to the client, so that the client will not terminate the communication), until a USER command arrives.

At step 3, the "USER xxx%aaa.com" command is received. Only the command that is relevant to the FTP process is stored in said buffer, i.e.—"USER xxx".

At step 4, an FTP process for the aaa.com domain is created.

At step 5, if the wrapper is a process (rather than a function), the execution of the wrapper is terminated. It should be noted that from steps 1 to 5 the session has been carried out between the client and the Inetd or by the wrapper, and not between the client and the FTP server, as in the prior art.

At step 6, the FTP process receives the commands stored in said buffer. Actually, the FTP server communicates with the wrapper (or with the information that the wrapper retained in the buffer) instead of with the client, but the FTP server is not "aware" of this fact. From this point on, the client communicates with the FTP server, as in the prior art.

At step 7, the PASS command is sent by the client to the FTP server in order to be validated.

At step 8, after the password has been validated by the FTP server, the client can send file-related commands such as download, upload, delete, and so forth, to be performed by the FTP server. It should be noted that the verification of the password is handled by the FTP server, and not by the wrapper. Therefore, if the user prefers to install special authentication modules for its FTP server, or to perform special actions on a failed login—these operations will be performed anyway.

Applying the Invention to Other Web Services

With a Web mail service, one can view and respond to his new e-mails from any computer with an Internet connection. The e-mail messages remain on the mail servers until the user checks his mail from his home computer again.

With POP (Post Office Protocol), mail is delivered to a server accessible through the Web, and a personal computer user periodically connects to the server and downloads all of the pending mail to the "client" machine. Thereafter, all mail processing is local to the client's machine.

SMTP (Simple Mail Transfer Protocol) is the standard e-mail protocol on the Internet. SMTP servers route SMTP messages throughout the Internet to a mail server, such as POP3 or IMAP4, which provides a message store for incoming mail.

Like the FTP protocol, Web mail protocols restrict the provision of services to a user by authenticating the user, which typically is carried out by the user name and a password. Since a user is usually associated with an account on the hosting computer, the provision of such services can be implemented in the same way as FTP.

HTTP (HyperText Transport Protocol) is the communications protocol used to connect to servers on the World Wide Web. Its primary function is to establish a connection with a Web server and transmit HTML pages to the client browser. Addresses of Web sites begin with an "http://" prefix.

For HTTP, there is a well-known solution called "Virtual hosting". Using this technique, the HTTP server can detect the domain that the user wishes to access (from a special line in the command), and therefore to access a different directory tree for each domain. However, this solution implies sharing the same Web server between the domains. Hence, this solution does not suite a Web hosting company, which has an interest to limit the resources that each domain receives, and probably charges each account according to its actual use.

According to one embodiment of the invention, a plurality of requests from a Web server can be executed simultaneously, such that each domain (or a group of domains) receives its own request. However, since only one Web server can use a certain port on a computer at a given moment, only one Web server can be active at that moment.

This limitation can be overcome by piping the data from the original socket to an "internal" socket, which actually can be accessed by a plurality of Web servers at a given moment.

Hence, the invention may be applied to HTTP services as well as to FTP and mail. By implementing the virtual hosting methods used in the prior art, i.e. the virtual hosting ability that is provided by a Web server, all the domains are served by a single Web server. However, according to the invention, several Web servers can run simultaneously, each one serving some of the domains. Therefore, a WHP can achieve better performance of the hosted Web sites.

It should be noted that receiving the connection, reading the requested domain and handing the socket with the information to the relevant Web server, is transparent to the server.

The above examples and description have of course been provided only for the purpose of illustration, and the invention can be implemented to any Web service including MIRC, Telnet, SSH, Rtelnet, and Shell.

The secured version of these services, as well as any other secured service, can be implemented in a similar approach. However, the implementation is not straightforward, as the secured services usually use a different encryption key for each domain. This key is used to prevent unauthorized computers from accessing the information, as well as to authenticate the server that the information is sent to. The solutions for implementing the same approach for the secured services might be:

To use the same key for all the domains on each server;

To modify the protocol to contain some information about the target domain in clear (i.e. not encrypted) text.

To try to decode the message using all the domains keys. Once the message is decrypted, the wrapper can pass the message to the target domain (which can be determined by the key upon which the decryption of the message is carried out).

A Name-Based VDS

According to copending Israeli Patent Application No. 147560, an emulation of a computer system in which a remote client can access its system utilities and programs is referred to as a Virtual Dedicated Server (VDS). According to said application, a plurality of VDS instances can be executed simultaneously on one hosting computer system, each referring to a different directory tree as its root directory.

Using the VDS technology, the FTP server can use a different "/etc/passwd" for each domain, thus resulting in a different set of allowed users for each domain (including the same user name in several domains).

Using the technology described herein, a plurality of VDSes can use a single IP address for the Web services provided by the VDSes.

FIG. 2 schematically illustrates Web servers hosted by VDS systems that are hosted by one computer system, according to a preferred embodiment of the invention.

The hosting computer 10, hosts the VDS systems 60 and 70. VDS 60 is hosting the FTP server 11, and the POP3 server 12. VDS 70 is hosting the POP3 server 21, FTP server 22 and HTTP server 23. Daemon 40 "listens" to the well-known FTP port, HTTP port, and POP3 port. Whenever the daemon 40 indicates a request for connection from a client 30, the wrapper 50 "negotiates" with the client 30 as the appropriate Web server until the domain is indicated. Then, the wrapper negotiates with the appropriate Web server 11, 12, 21, 22 or 23 as it was the client. At the last stage, a connection between the appropriate Web server and the client is established, until the communication session ends.

The "appropriate server" is indicated by two parameters: the port, which indicates the type of the server (FTP, HTTP, etc.), and the domain that indicates the appropriate VDS.

As described in copending Israeli Patent Application No. 147560, the performance of the system can be improved using hard links.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. A method for providing a service by a plurality of domains through a single IF' address, the method comprising:
   a) For each of the plurality of domains, allocating a server having a unique domain name and the IF' address, for providing the service, wherein the allocated server is an original, unmodified server;
   b) Providing a wrapper, the wrapper being a software module for intermediating between a client of the service and the server providing the service via a standard communication protocol for communicating with the server providing the service;
   c) Upon receiving a request for connecting a client to the server in order to provide the service:
      (i) Identifying the target domain name of the request by interacting between the client and the wrapper via the standard communication protocol, wherein the target domain name and the user name are embedded in a single command, separated by a symbol that is permitted by the standard communication protocol, wherein the symbol is at least one character that does not conform with the standard characters allowed in a username in the standard communication protocol,
   wherein the username phrase is one of "user%domain" and "domain%user", in which "user" is the username, "domain" is the domain name, and "%" is any symbol that does not conform to the standard communication protocol;
      (ii) Mediating the interaction between the wrapper and the server providing the service which is associated with using the target domain name by the standard communication protocol;
      (iii) Establishing a communication channel between the server and the client through the wrapper, such that the wrapper receives commands from the client using a modified protocol, and the server utilizes the standard communication protocol to receive the client requests;

(iv) keeping the wrapper active only until the requested server is identified, and the communication is handed to the requested server, and then terminating the wrapper;

(v) Starting a data connection between the client and the original, unmodified server to receive and respond to the client requests directly using the standard communication protocol; and (vi) Allowing the original, unmodified server to provide the service to the client;

(vii) Providing a buffer to each socket, for retaining temporarily the information received from the client, and reading the data from the buffer if it is not empty, or from the socket if the buffer is empty; and (viii) Ignoring any write command until the buffer is empty.

2. The method according to claim 1, wherein the services are any of POP3, SMTP, MIRC, Telnet, SSH, Rtelnet, and Shell.

3. The method according to claim 1, wherein each of the domains refers to a different Virtual Dedicated Server.

4. The method according to claim 1, wherein the IP address is associated with a computer system running any dialect of Unix, Solaris, Linux (including Red Hat, Debian, SuSE, FreeBSD), AIX, HP/UX, Tru64, or Irix.

5. The method according to claim 1, wherein each domain has its own instance of the server, the instance being a virtual server.

6. The method according to claim 5, wherein multiple servers providing services to multiple clients for at least some domains share the same disk space.

7. The method according to claim 6, wherein only one instance of a server resides at a Host, and is referenced by hard links from the domains.

8. The method according to claim 1, further comprising providing a replacement shared library including additional functionality compared to an original shared library to which the standard communication protocol refers.

9. The method according to claim 8, wherein the additional functionality of the replacement shared library is added to the original shared library by hooking.

10. The method according to claim 1, wherein a single encryption key is used for all domains on each Host.

11. The method according to claim 1, wherein the wrapper is provided with information related to secured services of the target domain in plain text.

12. A system for providing a service to a client by a plurality of domains, through a single IP address, the system comprising:

a plurality of servers, each server providing the service for a corresponding domain; and a wrapper, for intermediating between the client and the plurality of servers, using a standard communication protocol, wherein, for each request to connect the client to the server, the wrapper identifies a target domain name by interacting with the client via the standard communication protocol, interacts with the server associated with the target domain name via the standard communication protocol, and enables the server to provide the service to the client, wherein the server providing the service is a copy of an original, unmodified server out of the plurality of servers, wherein the target domain name and the user name are embedded in a single command, separated by a symbol that is permitted by the standard communication protocol, wherein the symbol is at least one character that does not conform with the standard characters allowed in a username in the standard communication protocol, a communication channel established through the wrapper between the server and the client, such that the wrapper receives commands from the client using a modified protocol, and the original, unmodified server utilizes the standard communication protocol to receive the client requests;

a data connection between the client and the original, unmodified server for receiving and responding to the client requests directly using the standard communication protocol, wherein the username phrase is one of "user%odomain" and "domain%user", in which "user" is the username, "domain" is the domain name, and "%" is any symbol that does not conform to the standard communication protocol;

a buffer provided to each socket, for retaining temporarily the information received from the client, wherein the data is read from the buffer if the buffer is not empty, or from the socket if the buffer is empty, and wherein any write command is ignored until the buffer is empty.

13. The system according to claim 12, further comprising a replacement shared library including additional functionality compared to an original shared library to which the standard communication protocol refers.

14. The system according to claim 13, wherein the additional functionality of the replacement shared library is added to the original shared library by hooking.

15. The system according to claim 12, wherein one encryption key is used for all domains on each server.

16. The system according to claim 15, wherein the wrapper is provided with information related to secured services of the target domain in plain text.

17. The system according to claim 12, wherein each domain has its own instance of the server, the instance being a virtual server.

18. The system according to claim 17, wherein servers corresponding to some of the domains share the same disk space.

19. The system according to claim 18, wherein only one instance of some of the servers resides at a Host, and is referenced by hard links from the domains.

20. The system according to claim 12, wherein the wrapper provides servers hosting the domain with additional functionality by hooking a replacement shared library to an original shared library of the standard communication protocol.

21. The method according to claim 1, wherein the services are any of HTTP and FTP.

* * * * *